(12) United States Patent
Ford et al.

(10) Patent No.: US 7,798,174 B2
(45) Date of Patent: Sep. 21, 2010

(54) ELECTRIC FLUID SERVO VALVE AND METHOD OF MAKING SAME

(75) Inventors: Greg E. Ford, Redford, MI (US); Harold L. Bowman, Lapeer, MI (US)

(73) Assignee: Eaton Corporation, Cleveland, OH (US)

( * ) Notice: Subject to any disclaimer, the term of this patent is extended or adjusted under 35 U.S.C. 154(b) by 667 days.

(21) Appl. No.: 10/644,135

(22) Filed: Aug. 20, 2003

(65) Prior Publication Data
US 2005/0039807 A1    Feb. 24, 2005

(51) Int. Cl.
F16K 11/24    (2006.01)
(52) U.S. Cl. ................................................. 137/884
(58) Field of Classification Search ............... 137/884, 137/487.5; 303/119.3; 251/129.04
See application file for complete search history.

(56) References Cited

U.S. PATENT DOCUMENTS

| | | | |
|---|---|---|---|
| 4,598,625 A | 7/1986 | Walters et al. ............... 91/433 |
| 5,806,565 A | 9/1998 | Kadlicko ............... 137/625.63 |
| 6,126,244 A | 10/2000 | Fries | |
| 6,662,825 B2 * | 12/2003 | Frank et al. .................. 137/884 |
| 6,715,510 B2 * | 4/2004 | Herbert ....................... 137/884 |
| 6,805,146 B2 * | 10/2004 | Albert et al. ................. 137/884 |
| 2002/0112765 A1 | 8/2002 | Frank et al. | |

FOREIGN PATENT DOCUMENTS

| | | |
|---|---|---|
| DE | 198 32 435 | 12/1998 |
| DE | 198 39 843 | 3/2000 |
| EP | 0 681 128 | 11/1995 |
| EP | 1 319 566 | 6/2003 |

* cited by examiner

*Primary Examiner*—John Fox
(74) *Attorney, Agent, or Firm*—Anna M. Shih

(57) ABSTRACT

A solenoid operated valve has a separate pressure sensing port communicating with the valve outlet port. A circuit board with a pressure transducer mounted over a sensing orifice in the board is attached to the valve body with the sensing orifice communicating with the sensing port in the valve body. The transducer thus provides a feedback signal indicative of the valve outlet pressure.

19 Claims, 1 Drawing Sheet

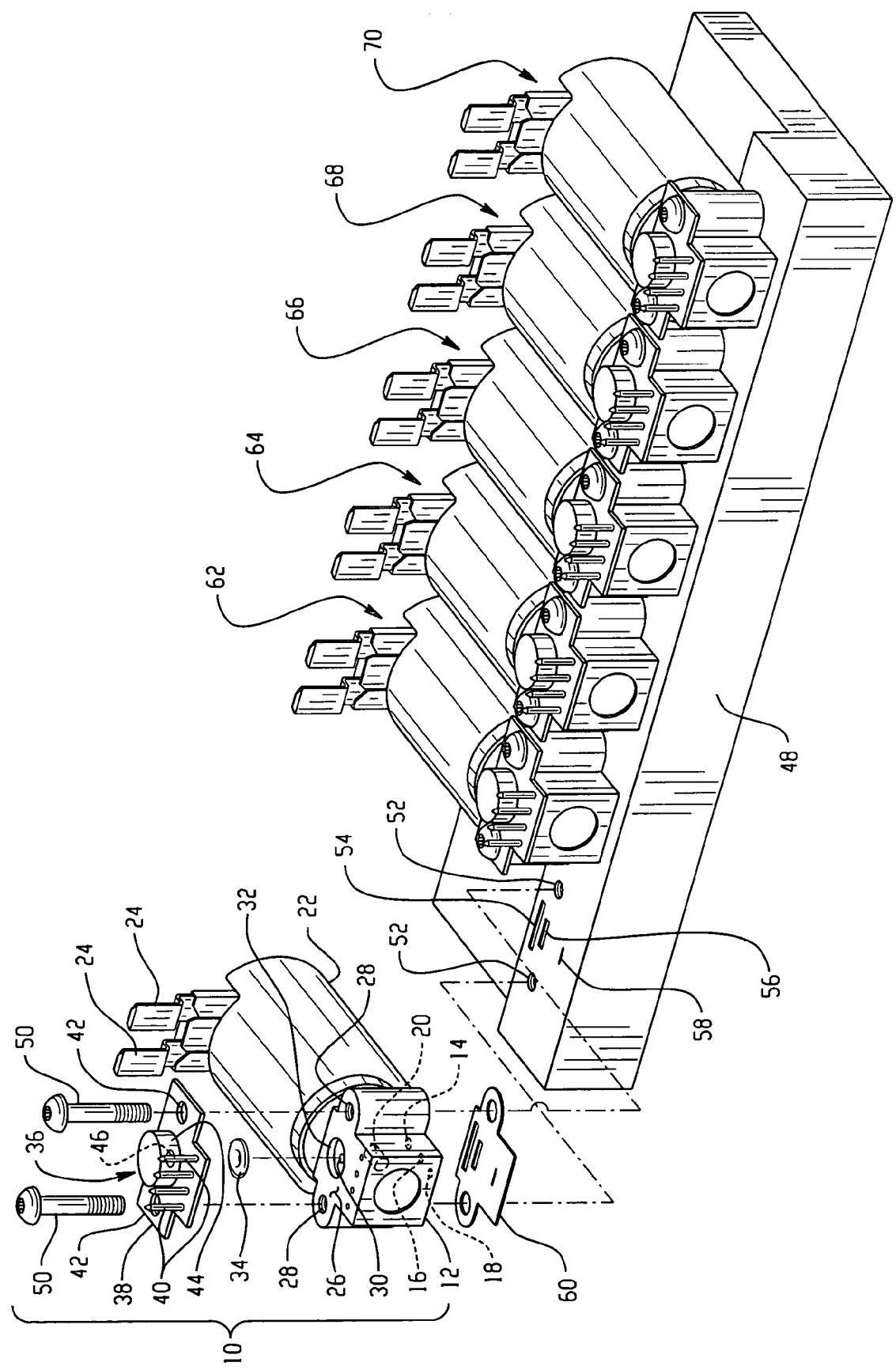

ELECTRIC FLUID SERVO VALVE AND METHOD OF MAKING SAME

BACKGROUND OF THE INVENTION

The present invention relates to electrically operated valves and particularly valves employing a solenoid operator for effecting opening and closing of the valve in response to an electric signal provided to the solenoid.

Valves of the aforesaid type are often employed in control functions in fluid systems on motor vehicles because of the adaptability of the solenoid for operation by the relatively low voltage direct current power supply found on the vehicle. One such application is found in the control of the shifting clutch actuators in automatic speed change power transmissions employed in motor vehicle powertrains. In particular, with the advent and widespread usage of electronic controllers for controlling the transmission shifting, it has been found particularly suitable to employ solenoid operated valves for controlling flow of pressurized hydraulic fluid to the individual shifting clutch actuators.

Recent fuel economy demands and exhaust emission requirements have necessitated more accurate control of the shifting in vehicle automatic transmissions and have resulted in increased numbers of speed changes or gear sets for controlling the engine speed in a region of optimum torque output for minimal rate of fuel consumption. Electronically controlled automatic vehicle power transmissions have employed a plurality or bank of solenoid operated valves disposed on the manifold for distributing pressurized fluid to the various clutch actuator circuits in response to signals from electronic controller. In an effort to improve the torque transmission during speed changes it has been desired to provide a continuous signal analogous to the torque transmitted to the transmission output for enabling more precise controlling of the shifting clutches. Such a signal in the form of a pressure feedback signal analogous to torque is shown and described in co-pending applicant Ser. No. 10/327,792 filed Dec. 23, 2002 entitled "Closed Loop Control Of Shifting Clutch Actuators In An Automatic Speed Change Transmission"; and, the implementation of a pressure sensor for providing a pressure feedback signal in such devices is shown and described in co-pending application Ser. No. 10/165,950 filed Jun. 10, 2002, entitled "Electro-Hydraulic Controller For Automatic Transmission" and Ser. No. 10/401,408 filed Mar. 28, 2003, entitled "Electro-Hydraulic Manifold Assembly With Lead Frame Mounted Pressure Sensors", which aforesaid co-pending applications are commonly owned by the assignee of the present application.

The aforesaid valve constructions for use in motor vehicle automatic power transmissions employ pressure sensors mounted either on the manifold or the electrical lead frame for enabling electrical connection to the solenoid operators for the individual valves However, this arrangement has proven relatively costly to manufacture, and difficult to assemble and install on the transmission during final assembly. Therefore, it has been desired to provided a simplified and low cost way or means of providing a fluid pressure output feedback signal for an electrically operated pressure control valve for a hydraulically operated system, such as the hydraulically operated shifting clutch actuators an automatic speed change power transmission for use in motor in motor vehicles.

BRIEF SUMMARY OF THE INVENTION

The present invention provides an electrically operated preferably solenoid actuated control valve with a pressure transducer connected to the outlet port for providing an electrical signal in real time indicative of the pressure supplied to the valve outlet. The valve of the present invention is particularly suitable for use in an electronically controlled automatic speed change power transmission for use in motor vehicles.

The present invention employs a valve body having an inlet and outlet port with an electric actuator, preferably a solenoid, attached thereto for effecting movement of an obturator in the body for controlling flow between an inlet port and an outlet port. A pressure sensing port is provided for communicating with the outlet port; and, a pressure transducer mounted on a printed circuit board is attached over the pressure sensing port with the transducer inlet sealed over the sensing port. The combination valve, circuit board and pressure transducer may then be attached as a unit to a manifold having a bank of such valves mounted thereon for installation on a vehicle automatic transmission.

BRIEF DESCRIPTION OF THE DRAWINGS

The single drawing is a perspective view of a manifold having a plurality of solenoid operated pressure control valves each with a pressure transducer mounted thereon for providing a pressure output feedback signal.

DETAILED DESCRIPTION OF THE INVENTION

Referring to the drawing, the valve assembly of the present invention is indicated generally at 10 and includes a valve body 12 having an inlet port 14 provided on the undersurface thereof as indicated in dashed outline and a signal outlet port 16 and an exhaust port 18 typically for a return to a pump inlet or sump. It will be understood that in the presently preferred practice of the invention, the valve employed is a pressure control valve providing a desired pressure at the signal pressure outlet port 16 by bleeding fluid to the exhaust port 18. However, alternatively, a two port valve may be employed for applications other than controlling shifting clutch actuators for an automatic transmission.

The valve body 12 includes a moveable obturator 20 indicated in dashed outline in the drawing which may comprise a spool for controlling pressure bleed to the exhaust port 18. Alternatively, obturator 20 may comprise a poppet. The valve body has attached thereto an electric operator preferably in the form of a solenoid 22 having connector terminals 24 provided thereon for external electrical connection thereto as, for example, to an electronic controller.

The valve body 12 preferably has a planar surface 26 formed on one side thereof; and, the valve body 12 in the presently preferred practice has a pair of mounting holes 28 formed through the surface 26 and extending through the body.

Body 12 has a pressure sensing port 30 formed through surface 26, which port communicates with the signal pressure outlet port 16 internally within the body 12. In the presently preferred practice of the invention, sensing port 30 is formed in the bottom of a counter-bore 32 formed in the surface 26. A suitable resilient seal, preferably in the form of an O-ring 34 is received in the counter-bore 32 for sealing about the sensing port 30 as will hereinafter be described.

A circuit board subassembly indicated generally at 36 includes a circuit board 38, preferably of the printed circuit type, having a plurality of electrical connector pins 40 provided thereon for external electrical connection thereto and extending preferably perpendicular to the face of the board 38. A pair of mounting holes 42 are formed through the board and are spaced to coincide with the mounting holes 28 on the valve body.

The sub-assembly 36 includes a pressure transducer 44 mounted on the board 38 with a sensing aperture 46 formed in the board as indicated in dashed line in the drawing, which aperture is located on the board to be aligned with the sensing port 30 in the valve body. It will be understood that the transducer 36 is attached to board 38 in a manner so as to align the pressure inlet port (not shown) of the transducer with the aperture 46. It will also be understood that the transducer 36 has electrical leads which are connected to leads provided on the board 38 in any suitable manner known in the art, as for example, by soldering, but which leads are omitted in the drawing for the sake of clarity; and, accordingly the transducer is electrically connected to pins 40.

The circuit board sub-assembly is received over the valve body on surface 26; and, a seal is provided about the sensing orifice 46 on the undersurface of board 38 by the O-ring 34 which seals also about the sensing port 30 in the valve body.

In the present application of the invention for application on an automatic transmission, the valve assembly 10 is attached to a manifold block 48 and is secured thereon by threaded fasteners 50 received through the mounting holes 28 and engaging threaded bores 52 formed in the manifold block.

The manifold block 48 has a pressure supply port 54, a pressure signal inlet port 56, and a return to sump port 58 provided thereon which ports 54, 56 and 58 are located so as to coincide respectively with the inlet port 14, pressure signal port 16 and exhaust port 18 on the valve body 12. In the presently preferred practice of the invention, a sealing gasket 60 is disposed between the undersurface of valve body 12 and the upper surface of the manifold 48 for sealing about the ports 54, 56, 58.

As illustrated in the drawing, manifold block 48 may include additional valve assemblies similar to the assembly 10 as denoted by reference numerals 62 through 70. It will be understood that the undersurface of the manifold includes appropriate ports unshown for communicating with the various valve ports such as 54, 56, 58 for each of the valve assemblies, which unshown manifold ports are adapted for mating with ports in the body of the automatic transmission to which the manifold is intended to be mounted.

The present invention thus provides a simple, relatively low cost and easy to manufacture and install control valve for a hydraulically actuated device such as on an automatic speed change transmission shift actuator and includes a pressure transducer mounted directly on the valve for providing a valve outlet pressure feedback signal to a controller. The present invention thus provides an improved, simple and relatively low cost way of providing closed loop electrical control of hydraulically actuated devices.

Although the invention has hereinabove been described with respect to the illustrated embodiments, it will be understood that the invention is capable of modification and variation and is limited only by the following claims.

What is claimed is:

1. A electric fluid servo valve assembly comprising:
   a solenoid valve that is connectable to a manifold, the solenoid valve having
      a valve body having a fluid inlet passage, a fluid outlet passage, and a pressure sensing port communicating with said outlet passage,
      an obturator disposed within the valve body and being moveable for controlling flow between said inlet passage and outlet passage upon connection of said inlet passage to a source of fluid; and
      an electric actuator disposed within the valve body and operable upon electrical energization for affecting movement of said obturator; and
   a circuit board with a pressure sensor disposed thereon, said circuit board having a sensing aperture and being disposed directly over the pressure sensing port in the valve body of the solenoid valve such that the sensing aperture is axially aligned with the pressure sensing port and the pressure sensor.

2. The valve assembly defined in claim 1, wherein said valve body has a planar surface with said pressure sensing port located thereon.

3. The valve assembly defined in claim 1, wherein said pressure sensor is a transducer and said circuit board includes circuitry for processing a signal output of said transducer.

4. The valve assembly defined in claim 1, wherein said pressure sensor includes a piezoelectric transducer.

5. The valve assembly defined in claim 1, wherein said electric actuator includes a solenoid.

6. The valve assembly defined in claim 1, wherein said sensing aperture in said pressure sensor is sealed over said pressure sensing port in said valve body with an annular seal ring.

7. The valve assembly defined in claim 1, wherein said sensing aperture in said pressure sensor includes an aperture formed through said circuit board.

8. The valve assembly defined in claim 1, wherein said electric actuator includes a plurality of discrete electrical terminals.

9. The valve assembly defined in claim 1, further comprising a manifold with a plurality of said valve bodies secured thereon with said inlet and outlet passages of each valve body communicating with corresponding inlet and outlet ports on said manifold.

10. A method of making a fluid electric servo valve assembly comprising:
   forming a solenoid valve that is connectable to a manifold, the solenoid valve being formed by
      providing a valve body having an inlet and outlet and a pressure sensing port communicating with the outlet;
      disposing a movable obturator in said valve body between said inlet and outlet for controlling flow therebetween; and
      disposing an electric actuator on said valve body and effecting movement of the obturator upon energization of the actuator; and
   disposing a circuit board with a pressure sensor thereon, the circuit board having a pressure sensing aperture that is disposed directly over the pressure sensing port in the valve body of the solenoid valve and is axially aligned with the pressure sensor and the pressure sensing port; and
   providing an electrical indication of the sensed pressure at the valve outlet.

11. The method defined in claim 10, further comprising disposing the valve body on a manifold block and connecting said inlet and outlet passages to corresponding inlet and outlet ports in said manifold.

12. The method of defined in claim 10, wherein said step of disposing a circuit board includes disposing the circuit board with a pressure sensor.

13. The method defined in claim 10, wherein said step of disposing an electric actuator includes disposing a solenoid to move obturator magnetically.

14. The method defined in claim 10, wherein said step of disposing a circuit board over said pressure sensing port in said valve body includes sealing said board over said port with an annular seal.

15. A electric fluid servo valve assembly comprising:
   a solenoid valve that is connectable to a manifold, the solenoid valve having
      a valve body having a fluid inlet passage, a fluid outlet passage, a pressure sensing port communicating with said outlet passage; an obturator disposed in the valve body and moveable for controlling flow between said inlet passage and outlet passage upon connection of said inlet passage to a source of fluid; and
      an electric actuator disposed with the valve body and operable upon electrical energization for effecting movement of the obturator; and
   a pressure sensor having an inlet port that is axially aligned with a sensing aperture on a circuit board, the sensing aperture being disposed directly over and axially aligned with the pressure sensing port in the valve body of the solenoid valve such that the sensing aperture in the circuit board communicates with the inlet port through the pressure sensing port.

16. The valve assembly defined in claim 15, wherein said valve body has a planar surface with said pressure sensing port located thereon.

17. The valve assembly defined in claim 15, wherein said pressure sensor is a transducer.

18. The valve assembly defined in claim 15, wherein said electric actuator includes a solenoid.

19. The valve assembly defined in claim 15, further comprising a manifold with a plurality of said valve bodies secured thereon with said inlet and outlet passages of each valve body communicating with corresponding inlet and outlet ports on said manifold.

* * * * *